US011734430B2

(12) United States Patent
Edwards et al.

(10) Patent No.: US 11,734,430 B2
(45) Date of Patent: Aug. 22, 2023

(54) CONFIGURATION OF A MEMORY CONTROLLER FOR COPY-ON-WRITE WITH A RESOURCE CONTROLLER

(71) Applicant: Hewlett Packard Enterprise Development LP, Houston, TX (US)

(72) Inventors: Nigel Edwards, Bristol (GB); Chris I. Dalton, Bristol (GB); Keith Mathew McAuliffe, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1392 days.

(21) Appl. No.: 15/735,660

(22) PCT Filed: Apr. 22, 2016

(86) PCT No.: PCT/US2016/028902
§ 371 (c)(1),
(2) Date: Dec. 12, 2017

(87) PCT Pub. No.: WO2017/184168
PCT Pub. Date: Oct. 26, 2017

(65) Prior Publication Data
US 2018/0365428 A1 Dec. 20, 2018

(51) Int. Cl.
*G06F 21/00* (2013.01)
*G06F 21/57* (2013.01)
(Continued)

(52) U.S. Cl.
CPC ............ *G06F 21/577* (2013.01); *G06F 9/455* (2013.01); *G06F 9/45558* (2013.01);
(Continued)

(58) Field of Classification Search
CPC ......... H04L 43/00; H04L 45/22; H04L 45/60; H04L 45/74; H04L 47/70; H04L 47/78;
(Continued)

(56) References Cited

U.S. PATENT DOCUMENTS 5,619,682 A * 4/1997 Mayer ................. G06F 9/45537
703/26
6,718,352 B1 4/2004 Dang et al.
(Continued)

FOREIGN PATENT DOCUMENTS

CN 1481534 A 3/2004
CN 104346304 A 2/2015
(Continued)

OTHER PUBLICATIONS

Jacoby et al "Mobile Security Using Separated Deep Packet Inspection" 5th IEEE Consumer Communications and Networking Conference, 2008, pp. 482-487.
(Continued)

*Primary Examiner* — Morshed Mehedi
(74) *Attorney, Agent, or Firm* — Trop, Pruner & Hu, P.C.

(57) ABSTRACT

Examples include configuration of a memory controller for copy-on-write with a resource controller. Some examples include, in response to a determination to take a snapshot of memory accessible to a first component, a resource controller configuring a memory controller to treat location IDs, mapped to initial memory locations of the accessible memory, as copy-on-write for the first component and not for a second component independent of the resource controller after the configuring.

15 Claims, 5 Drawing Sheets

(51) Int. Cl.
*G06F 9/455* (2018.01)
*G06F 21/50* (2013.01)
*G06F 13/16* (2006.01)

(52) U.S. Cl.
CPC .......... *G06F 13/16* (2013.01); *G06F 13/1668* (2013.01); *G06F 21/50* (2013.01); *G06F 2009/45583* (2013.01); *G06F 2009/45587* (2013.01); *G06F 2009/45591* (2013.01)

(58) Field of Classification Search
CPC ......... H04L 49/00; H04L 49/10; H04L 49/15; H04L 49/45; H04L 49/70; H04L 45/90; H04L 69/22; G06F 12/12; G06F 13/00; G06F 13/40; G06F 15/80; G06F 21/79
See application file for complete search history.

(56) References Cited

U.S. PATENT DOCUMENTS

| | | | |
|---|---|---|---|
| 7,047,380 | B2 | 5/2006 | Tormasov et al. |
| 7,127,581 | B2 | 10/2006 | Watanabe |
| 7,269,631 | B2 | 9/2007 | Reuter et al. |
| 7,415,709 | B2 | 8/2008 | Hipp et al. |
| 7,697,515 | B2 | 4/2010 | Ofer et al. |
| 7,886,119 | B1 | 2/2011 | Cameron et al. |
| 7,913,123 | B2 | 3/2011 | Al-Omari et al. |
| 7,917,481 | B1 | 3/2011 | Kale et al. |
| 8,014,976 | B2 | 9/2011 | Carpenter et al. |
| 8,031,632 | B2 | 10/2011 | McGee et al. |
| 8,082,411 | B1 | 12/2011 | Seetharam et al. |
| 8,266,407 | B2 | 9/2012 | Karamcheti et al. |
| 8,307,154 | B2 | 11/2012 | Stabrawa et al. |
| 8,312,258 | B2 | 11/2012 | Xing et al. |
| 8,359,491 | B1 | 1/2013 | Bloomstein |
| 8,489,799 | B2 | 7/2013 | Factor et al. |
| 8,495,325 | B2 | 7/2013 | Yamamoto et al. |
| 8,538,919 | B1* | 9/2013 | Nielsen ................ G06F 9/5077 380/277 |
| 8,615,501 | B2 | 12/2013 | Lorenz et al. |
| 8,799,222 | B2 | 8/2014 | Marathe et al. |
| 8,909,990 | B2 | 12/2014 | Davis et al. |
| 8,996,805 | B2 | 3/2015 | Black et al. |
| 9,117,081 | B2 | 8/2015 | Lukacs et al. |
| 9,202,046 | B2 | 12/2015 | Dumitru et al. |
| 2004/0024961 | A1 | 2/2004 | Cochran et al. |
| 2004/0093474 | A1* | 5/2004 | Lin ..................... G06F 16/1727 711/162 |
| 2005/0027956 | A1 | 2/2005 | Tormasov et al. |
| 2006/0156074 | A1* | 7/2006 | Kumar ................ G06F 11/3648 714/51 |
| 2006/0168269 | A1* | 7/2006 | Sather ..................... H04L 67/16 709/230 |
| 2006/0206677 | A1 | 9/2006 | Kim et al. |
| 2007/0174669 | A1 | 7/2007 | Ebata et al. |
| 2008/0209132 | A1 | 8/2008 | Chen |
| 2008/0256145 | A1 | 10/2008 | Dalton et al. |
| 2010/0114832 | A1 | 5/2010 | Lillibridge et al. |
| 2010/0228919 | A1 | 9/2010 | Stabrawa et al. |
| 2011/0107025 | A1 | 5/2011 | Urkude et al. |
| 2011/0178972 | A1 | 7/2011 | Navarro et al. |
| 2011/0219201 | A1 | 9/2011 | Ranade |
| 2011/0238937 | A1* | 9/2011 | Murotani .............. G06F 3/0689 711/162 |
| 2012/0030424 | A1 | 2/2012 | Nunez et al. |
| 2012/0278567 | A1 | 11/2012 | Broido et al. |
| 2012/0278803 | A1 | 11/2012 | Pavlov |
| 2012/0324236 | A1 | 12/2012 | Srivastava et al. |
| 2013/0332660 | A1 | 12/2013 | Talagala et al. |
| 2013/0332684 | A1 | 12/2013 | Kandiraju et al. |
| 2014/0040576 | A1 | 2/2014 | Cordero et al. |
| 2014/0040669 | A1* | 2/2014 | Davis ................ G06F 11/3636 714/37 |
| 2014/0068601 | A1 | 3/2014 | Simms et al. |
| 2014/0114922 | A1 | 4/2014 | Prahlad et al. |
| 2014/0195719 | A1 | 7/2014 | Abali et al. |
| 2014/0201836 | A1 | 7/2014 | Amsler et al. |
| 2014/0259169 | A1* | 9/2014 | Harrison ................ G06F 21/554 726/23 |
| 2014/0325610 | A1 | 10/2014 | Hitomi et al. |
| 2014/0325616 | A1 | 10/2014 | Dolph et al. |
| 2015/0033227 | A1 | 1/2015 | Lim et al. |
| 2015/0039815 | A1 | 2/2015 | Klein |
| 2015/0106803 | A1* | 4/2015 | Srivastava ........... G06F 9/45533 718/1 |
| 2015/0169413 | A1 | 6/2015 | Ngo et al. |
| 2015/0261470 | A1 | 9/2015 | Fiske et al. |
| 2015/0278017 | A1 | 10/2015 | Trezise et al. |
| 2016/0364341 | A1* | 12/2016 | Banginwar .......... G06F 9/45545 |

FOREIGN PATENT DOCUMENTS

| | | |
|---|---|---|
| CN | 104854566 A | 8/2015 |
| CN | 107533524 A | 1/2018 |
| EP | 2283420 A1 | 2/2011 |
| WO | 02/50716 A1 | 6/2007 |
| WO | WO-2008127831 A1 | 10/2008 |
| WO | WO-2010042109 A1 | 4/2010 |
| WO | 2010/060721 A1 | 6/2010 |
| WO | WO-2013012444 | 1/2013 |
| WO | 2014/025594 A1 | 2/2014 |
| WO | WO-2015112150 | 7/2015 |
| WO | WO-2015116077 | 8/2015 |
| WO | WO-2015116078 | 8/2015 |
| WO | 2015/137954 A1 | 9/2015 |
| WO | 2016/085463 A1 | 6/2016 |
| WO | 2016/118128 A1 | 7/2016 |
| WO | WO-2017050384 | 3/2017 |

OTHER PUBLICATIONS

Ashlee Vance, "With 'The Machine,' HP May Have Invented a New Kind of Computer", available online at <https://web.archive.org/web/20150924150115/http://www.businessweek.com/printer/articles/206401-with-the-machine-hp-may-have-invented-a-new-kind-of-computer>, Jun. 11, 2014, 4 pages.

Azab et al., "HyperSentry: Enabling Stealthy In-context Measurement of Hypervisor Integrity", CCS'10, Oct. 4-8, 2010, 12 pages.

Cfheoh, "Snapshots? Don't have a C-O-W about it!", available online at <https://storagegaga.wordpress.com/2011/08/09/snapshots-dont-have-a-c-o-w-about-it/>, Aug. 9, 2011, pp. 1-4.

Hewlett Packard Labs, "The Machine: A new kind of computer", available online at <https://web.archive.org/web/20160220151818/http://www.labs.hpe.com/research/themachine/>, Feb. 20, 2016, 6 pages.

James Niccolai, "HP's 'Machine' is a big bet on the future of server hardware," PCWorld News, available online at <https://www.pcworld.com/article/2362460/hps-machine-is-a-big-bet-on-the-future-of-server-hardware.html>, Jun. 11, 2014, 3 pages.

Jamie Condliffe, "HP Invented a New Computer That Could Make Data Centers Obsolete," available online at <https://gizmodo.com/hp-invented-a-new-computer-that-could-make-data-centers-1589212272>, Jun. 11, 2014, 3 pages.

Jon Fingas, "HP's Machine technology rethinks the basics of computing," available online at <https://www.engadget.com/2014/06/11/hp-the-machine/>, Jun. 11, 2014, 9 pages.

Julie Bort, "The Machine: HP Unveils Revolutionary Computer That Could Shrink A Data Center To The Size Of A Refrigerator," available online at <https://web.archive.org/web/20160306000754/http://www.businessinsider.com/hp-shows-off-new-kind-of-computer-2014-6>, Jun. 11, 2014, 4 pages.

Marc Staimer, "Using different types of storage snapshot technologies for data protection", available online at <https://searchdatabackup.techtarget.com/tip/Using-different-types-of-storage-snapshot-technologies-for-data-protection>, Dec. 21, 2009, pp. 1-4.

Neeta Garimella, "Snapshot technology overview", Apr. 26, 2006, pp. 1-8.

Petroni et al., "Copilot-a Coprocessor-based Kernel Runtime Integrity Monitor," Proceedings of the 13th USENIX Security Symposium, Aug. 9-13, 2004, 16 pages.

(56) References Cited

OTHER PUBLICATIONS

Quora, "What is Copy-on-Write and how is it used in C++?", available online at <https://www.quora.com/What-is-Copy-on-Write-and-how-is-it-used-in-C++>, retrieved on Mar. 16, 2020, 3 pages.
Zhang et al., "Hypercheck: A hardware-assisted Integrity Monitor", 2014, IEEE Transactions on Dependable and Secure Computing, vol. 11, No. 4, pp. 332-344.
Andrew Case, "New Paper: In Lieu of Swap: Analyzing Compressed RAM in Mac OS X and Linux," Aug. 14, 2014.
Belmanu Sadananda et al, "Snapshot Storage Management," International Patent Application No. PCT/US2015/051596, filed Sep. 23, 2015.
Bianchi et al., "Blacksheep: detecting compromised hosts in homogeneous crowds," Proceedings of the 2012 ACM conference on Computer and communications security, ACM, 2012.
Clark, Christopher, et al. "Live migration of virtual machines." Proceedings of the 2nd conference on Symposium on Networked Systems Design & Implementation—vol. 2. USENIX Association, 2005.
Colp et al., "VM Snapshots," Feb. 24-25, 2009, Xen Summit at Oracle.
ForensicsWiki, "Tools:Memory Imaging," Nov. 18, 2015.
Garfinkel et al., "A Virtual Machine Introspection Based Architecture for Intrusion Detection," NDSS, vol. 3, 2003.
Graziano, M., et al., Hypervisor Memory Forensics, Jun. 14, 2014, 20 pages.
Hitachi, "Hitachi Copy-on-Write Snapshot User Guide," 2013, Hitachi Virtual Storage Platform.
Korolev, D., et al., Understanding Rootkits: Using Memory Dump Analysis for Rootkit Detection, Nov. 22, 2013, Digital Forensics Articles and Research Papers, 10 pages.
Litz et al., SI-TM: reducing transactional memory abort rates through snapshot isolation, 2014, ACM SIGPLAN Notices, 49(4), pp. 383-398.
Lu et al., "Virtual Machine Memory Access Tracing With Hypervisor Exclusive Cache," 2007, 2007 USENIX Annual Technical Conference.
Microsoft, "Hyper-V Architecture," Aug. 14, 2015.
Muniswamy-Reddy et al., "A Versatile and User-Oriented Versioning File System," Mar. 2004, FAST, vol. 4, pp. 115-128.
Potter et al., "Two-person control administration: Preventing administration faults through duplication," Nov. 2009, Proc. of LISA.
Richard et al., "In lieu of swap: Analyzing compressed RAM in Mac OS X and Linux," 2014, Digital Forensics Research Workshop.
Sicherung, F., et al., Forensic Acquisition and Analysis of Volatile Data in Memory (Thesis), Dec. 18, 2013, 124 pages.
Siddiqui et al., "Parallel Assertion Processing using Memory Snapshots," 2009.
Srinivasan, et al., "Mlvmm: A micro VMM for development of a trusted code base," Jun. 17, 2015.
Srivastava, A., et al., Trusted VM Snapshots in Untrusted Cloud Infrastructures, Jun. 15, 2012; 20 pages.
Teller, T. et al., Enhancing Automated Malware Analysis Machines with Memory Analysis, Jul. 23, 2014, 5 pages.
The Volatility Foundation, "About The Volatility Foundation," Nov. 16, 2015.
Triumfant, "Discovering & Remediating Malicious Attacks", Whitepaper, May 2015.
VMware "Understanding virtual machine snapshots in VMware ESXi and ESX," Apr. 23, 2015, Knowledge Base, No. 1015180.
VMware, "Security of the VMware vSphere® Hypervisor," Jan. 2014.
Wang, J., et al., Hypercheck: a Hardware-assisted Integrity Monitor, Jul. 3, 2010 20 pages.
Wikipedia, "Copy-on-write," Sep. 25, 2015.
Wikipedia, "Dirty bit," Aug. 4, 2015.
Wikipedia, "Snapshot (computer storage)," Apr. 18, 2015.
Wikipedia, "Page Table," Oct. 11, 2015.
WindowsScope, "Products Overview," WindowsSCOPE: Windows Memory Forensics, Cyber Security Tools, (webpage), Nov. 18, 2015.
Zhaos; "XtremIO Overview: Snapshot Technologies for Oracle Database" (Research Paper); Dec. 1, 2013; 3 pages.
Rahmatian et al "Adaptable intrusion detection using partial runtime reconfiguration" [online] Published to IEEE Xplore Dec. 13, 2012 [retrieved on Oct. 29, 2018], Retrieved from the Internet <URL: https://ieeexplore.ieee.org/document/6378633> (Year: 2012).
Moon et al "Detecting and Preventing Kernel Rootkit Attacks with Bus Snooping" [online] Published Jun. 10, 2015 [retrieved on Oct. 29, 2018], Retrieved from the Internet <URL: https://ieeexplore.ieee.org/document/7120934> (Year: 2015).
Ligh et al., "The Art of Memory Forensics: Detecting Malware and Threats in Windows, Linux, and Mac Memory", Wiley, 2014, 914 pages.
International Search Report and Written Opinion received for PCT Patent Application No. PCT/US2016/028902, dated Jan. 20, 2017, 10 pages.
International Search Report and Written Opinion received for PCT Patent Application No. PCT/US2015/062665, dated Aug. 24, 2016, 7 pages.
International Preliminary Report on Patentability received for PCT Patent Application No. PCT/US2016/028902, dated Nov. 1, 2018, 8 pages.
International Preliminary Report on Patentability received for PCT Patent Application No. PCT/US2015/062665, dated Jun. 7, 2018, 6 pages.
Garimella, N.; "Understanding and exploiting snapshot technology for data protection, Part 1: Snapshot technology overview"; Apr. 26, 2006; 8 pages.
European Search Report and Search Opinion Received for EP Application No. 15909415.0, dated Dec. 4, 2017, 7 pages.
Extended European Search Report, EP Application No. 16894801.6, dated Apr. 12, 2018, pp. 1-7, EPO.

* cited by examiner

CONFIGURATION OF A MEMORY CONTROLLER FOR COPY-ON-WRITE WITH A RESOURCE CONTROLLER

BACKGROUND

Security issues in a computing environment may be discovered through a process of forensic analysis of the contents of the memory of the computing environment. For example, a forensic analysis process may be performed on memory of a computing device to search for security issues, such as the presence of malicious code (or "malware"). In such examples, through investigation of artifacts in the memory, such as processes running or recently run, network connections, open files, command histories, and the like, the forensic analysis process may reveal how the malware is hiding and how it is behaving.

BRIEF DESCRIPTION OF THE DRAWINGS

The following detailed description references the drawings, wherein.

DETAILED DESCRIPTION

Figure 1:
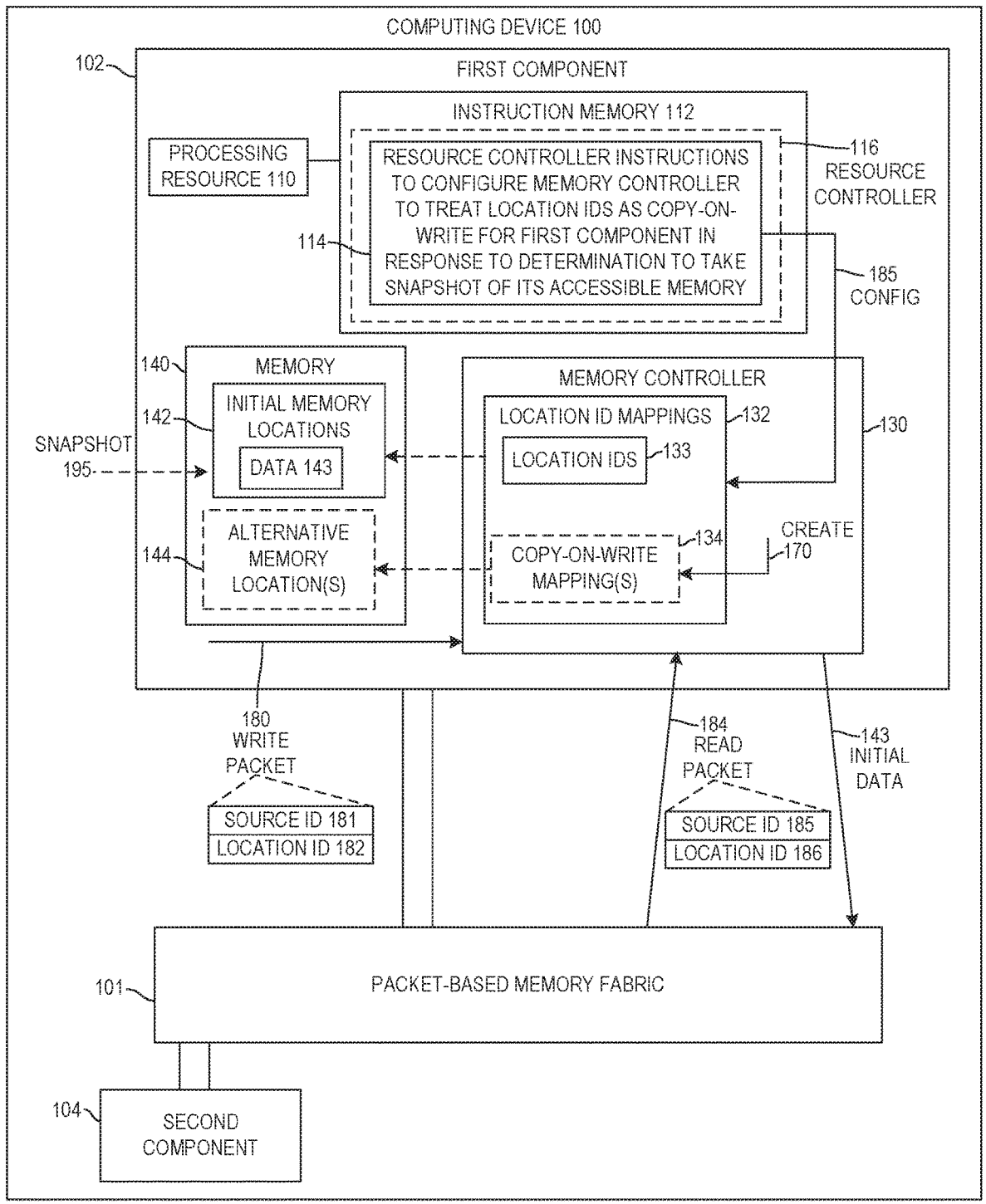
FIG. 1 is a block diagram of an example computing device to configure a memory controller for copy-on-write.

As noted above, forensic analysis for a computing device may involve analyzing the contents of the memory of the computing device to detect security issues, such as the presence of malware. In some examples, a snapshot of the contents of memory may be taken so that the snapshot may be analyzed with a forensic analysis process. In examples described herein, a "snapshot" of a portion of memory may be a stored collection of the data present in the memory at a given time.

In some examples, an executing operating system (OS) or virtual machine (VM) may be paused while the snapshot is taken to obtain an accurate snapshot of the memory. However, such a pause disrupts the service provided by the OS or VM, and in some cases may be detected by malware which may evade detection in response. In other examples, a snapshot may be taken while running processes (e.g., OS, VM, or application(s)) continue to operate on the memory. Such examples may not have the drawbacks of a system pause, as described above, but may instead lead to a snapshot that includes inconsistencies or inaccuracies as the running process(es) modify the memory as the snapshot is being taken. In still other examples, a hypervisor managing the memory including the snapshot may cause a VM to exit or pause, for appropriate memory processing, each time the VM attempts to write to a memory location included in the snapshot, which may significantly slow operation of the hypervisor and VMs managed by the hypervisor.

To address these issues, examples described herein may take a substantially instant, in-place snapshot of a portion of memory by using a resource controller to configure a memory controller to treat that portion of memory as copy-on-write for first component(s) that might alter the memory (e.g., when executing an OS) and not for second component(s) that are to execute a forensic analysis on the snapshot. By configuring the memory controller in this manner, the portion of memory to be analyzed may be protected from changes, thereby creating an in-place snapshot of the memory, while allowing components that may write to the memory to continue their operation substantially without interruption by performing writes to other memory separate from the snapshot.

In examples described herein, a memory controller may map location identifiers (IDs) (e.g., logical memory addresses or locations) to physical memory locations or addresses of an associated memory (e.g., an associated memory device). In examples described herein, the resource controller (e.g., a hypervisor, etc.), may configure the memory controller such that the memory controller may treat the location IDs as copy-on-write for the first component(s) and not for the second component(s), independent of involvement of the resource controller after the memory controller is configured in this manner by the resource controller. In such examples, by offloading the differential treatment of hardware component access to memory locations from the resource controller to the memory controller, examples described herein may preserve the memory snapshot, while allowing running processes to continue operation on appropriate data in memory, all with much less impact on the performance of the resource controller and other related resources (e.g., VMs managed by the resource controller), for example.

Examples described herein may include a computing device comprising first and second hardware components interconnected by a packet-based memory fabric, and memory accessible to the first component via a memory controller mapping location identifiers (IDs) to initial memory locations of the accessible memory for the first and second components. In such examples, a resource controller of the computing device may determine to take a snapshot of memory accessible to the first component, and in response may configure the memory controller to treat the location IDs as copy-on-write for the first component and not for the second component, such that the differential treatment is performed independent of the resource controller after the configuring. In examples described herein, functionalities performed by the memory controller independent of the resource controller may be performed by the memory controller without the resource controller performing or managing the functionalities either in whole or in part. In examples described herein, after the configuring described above, the differential treatment may be performed by the memory controller such that the performance of the differential treatment is isolated from the resource controller and is not managed or otherwise performed (in whole or in part) by the resource controller. Rather, the differential treatment described herein is offloaded to the resource controller by configuring the memory controller to treat the location IDs as copy-on-write for the first component and not for the second component, as described above.

In such examples, in response to a write packet comprising information identifying the first component as a source and indicating a given one of the location IDs for a write operation, the memory controller may, independent of the resource controller, create a copy-on-write mapping of the given location ID to an alternate memory location for the first component. In such examples, after creating the copyon-write mapping and in response to a read packet comprising information identifying the second component as a source and indicating the given location ID for a read operation, the memory controller may, independent of the resource controller, return data stored in the initial memory location to which the given location ID is mapped for the second component. In such examples, the memory controller may create the copy-on-write mapping of the given location ID to an alternate memory location for the first component without the creation being performed or managed, in whole or in part, by the resource controller, to thereby perform the creation independent of the resource controller. In such examples, after creating the copy-on-write mapping and in response to a read packet comprising information identifying the second component as a source and indicating the given location ID for a read operation, the memory controller may return data stored in the initial memory location to which the given location ID is mapped for the second component without the creation being performed or managed, in whole or in part, by the resource controller and thereby independent of the resource controller.

In this manner, examples described herein may take a snapshot of memory accessible to the first component by configuring memory controller(s) managing the memory accessible to the first component as copy-on-write for the first component, thereby freezing the current content of the accessible memory while also allowing process(es) (e.g., an OS, VM(s), etc.) executing at least partially on the first component to continue to operate without substantial interruption. Additionally, by enabling the second component to continue to access the initial memory locations, which will not be changed by the first component, process(es) executing at least in part on the second component (e.g., a forensic analysis system) may operate on a memory snapshot that will not be altered by any first component process(es) that continue to operate. In this manner, examples described herein may enable a memory snapshot to be taken and analyzed without a substantial pause in operating process(es) (e.g., an OS) and without introducing inconsistencies into the snapshot.

Referring now to the drawings, FIG. 1 is a block diagram of an example computing device 100 to configure a memory controller 130 for copy-on-write. Computing device 100 includes a plurality of hardware components, including a first component 102 and a second component 104. The hardware components are interconnected to communicate using a packet-based memory fabric 101.

In examples described herein, a "hardware component" (or "component") may be a hardware device able to send packets to and receive packets from other hardware device(s) via the packet-based memory fabric 101. As examples, a component may be at least one of a system-on-chip (SOC) (e.g., including processor core(s) and memory), a memory module including memory but excluding any processor core(s), a device including at least one SOC and at least one memory device on the same printed circuit board (PCB), a processor core (e.g., of another component), electronic circuitry (e.g., of another component) such as at least one of an application-specific integrated circuit (ASIC) and a field-programmable gate array (FPGA), a router to route packets in the fabric 101, or the like.

Packet-based memory fabric 101 may interconnect components for point-to-point communication of packets, switched communication of packets, or a combination thereof. Packet-based memory fabric 101 may be implemented using wires, traces, wireless communication technologies, optical communication technologies, or the like, or a combination thereof. In examples described herein, hardware components are able to generate packets for communication on memory fabric 101, the packets including at least a component identifier (CID) that identifies the source of the packet (or sender), and an operation identifier that indicates a requested operation to be performed in response to the packet (e.g., read, write, etc.). In some examples, a packet (such as a read packet for a read operation or a write packet for a write operation) may include a location identifier (ID), such as an address, indicating a physical or logical memory address to be read from (for read packets) or written to (for write packets). For switched communication of packets, packet-based memory fabric 101 may include router(s) to route packets from source components to destination components. In such examples, a packet may include a destination CID identifying the destination component that the packet is to be routed to or otherwise provided to via memory fabric 101.

In the example of FIG. 1, computing device 100 further includes a resource controller 116. In the example of FIG. 1, computing device 100 includes at least one processing resource 110 and instruction memory 112. In the example of FIG. 1, instruction memory 112 includes at least instructions 114 executable by processing resource(s) 110 to execute functionalities of resource controller 116 described herein. In examples described herein, instruction memory 112 may be implemented by at least one machine-readable storage medium.

In examples described herein, a "resource controller" may be a controller implemented by machine-readable instructions executable by processing resource(s) of computing device(s) to configure a memory controller for copy-on-write, as described herein. In some examples, a resource controller may be a hardware-interface manager that is executable by processing resource(s) to interface with hardware for other process(es), resource(s), etc., of a computing device, and able to configure a memory controller for copy-on-write, as described herein. For example, a hardware-interface manager may be a hypervisor (or sidevisor) of a computing device to virtualize hardware resource(s) of the computing device for use by other executable resource(s), such as virtual machine(s), operating system(s), process(es), or the like, or a combination thereof. In other examples, a hardware-interface manager may be another type of manager that is executable by processing resource(s) of a computing device to virtualize hardware resource(s) of the computing device for other executable resource(s). In some examples, a hardware-interface manager may be another type of manager that, when executed by processing resource(s) of a computing device, may have direct access to at least one hardware resource of the computing device that is not directly accessible to another resource controller associated with the hardware-interface resource. In such examples, the hardware-interface manager may be an integrity management process associated with security technology (e.g., ARM® TrustZone®), the process having direct access to at least one hardware resource of the computing device that is not directly accessible to another, separate process associated with the hardware-interface resource. In each of the examples of a hardware-interface manager described above, hardware-interface manager may be executable to configure a memory controller for copy-on-write, as described herein, in addition to other functionalities of the hardware-interface manager described above.

In some examples, a resource controller may be any of a virtual machine, operating system, user-space process, or the like, or a combination thereof, executable to configure a memory controller for copy-on-write, as described herein. In some examples, the resource controller may be an operating system kernel. In some examples, an operating system on a computing device may have a segmented kernel architecture comprising a management kernel segment to manage multiple processes of the computing device and multiple process kernel segments, each associated with one of the managed processes. In such examples, the resource controller may be the management kernel segment of the operating system, wherein, in addition to other functionalities, the management kernel segment is executable to configure a memory controller for copy-on-write, as described herein.

In some examples, computing device 100 may include a management subsystem that may perform management functions for computing device 100. In some examples, the management subsystem may communicate with the hardware components through management channels separate from the memory fabric 101, via the packet-based memory fabric 101, or a combination thereof. In some examples, the management subsystem may be implemented in hardware or by a combination of hardware and programming (e.g., machine-readable instructions executable by processing resource(s) of a computing device).

Computing device 100 may include a memory controller 130 and associated memory 140. In examples described herein, "memory" may be implemented by at least one machine-readable storage medium, as described below. In examples described herein, a memory controller may be a hardware device or a combination of hardware and programming to mediate access to associated physical memory. A memory controller may map location IDs (e.g., logical memory addresses or locations) to physical memory locations or addresses of an associated memory (e.g., an associated memory device). In examples described herein, a memory controller may store a mapping of location IDs to memory locations in any suitable format (e.g., data structure), and may store the mapping within the memory controller, outside of but accessible to the memory controller, or a combination thereof.

In the example of FIG. 1, first component 102 may include memory 140 and memory controller 130 to mediate access to memory 140. For example, first component 102 may be an SOC comprising processor core(s) (see FIG. 2), memory 140, and memory controller 130. In other examples, either or both of memory 140 and memory controller 130 may be separate from first and second components 102 and 104 but connected to them via memory fabric 101. For example, first component 102 may be an SOC comprising processing resource(s) 110, instruction memory 112, and memory controller 103, for example, while some or all of memory 140 is implemented in a hardware component separate from first component 102. In the example of FIG. 1, instruction memory 112 is separate from memory 140. In other examples, resource controller instructions 114 of resource controller 116 may be stored on memory 140, from which processing resource(s) 110 (e.g., processor core(s)) may fetch and execute instructions 114.

In the example of FIG. 1, resource controller 116 (or another resource, such as the management subsystem) may configure memory controller 130 such that at least a portion of memory 140 may be accessible to first component 102 with read-write access via memory controller 130. In the example of FIG. 1, the memory accessible to first component 102 may include initial memory locations 142 (e.g., physical memory locations or addresses), and memory controller 130 may control location ID mapping data 132 that maps location IDs 133 to the initial memory locations 142 for first component 102.

In the example of FIG. 1, resource controller 116 (e.g., instructions 114 of resource controller 116, when executed by processing resource(s) 110) may determine to take a snapshot of memory 142 accessible to first component 102. For example, instructions 144 may determine to take the snapshot in response to detection of an integrity violation associated with first component 102, as described below. In examples described herein, functionalities described as performed by resource controller 116 may be performed by instructions 114 of resource controller 116, when executed by processing resource(s) 110. Similarly, functionalities described as performed by instructions 114 (e.g., when executed by processing resource(s) 110) may be considered performed by resource controller 116.

In response to the determination, resource controller 116 may configure 185 memory controller 130 to treat location IDs 133 as copy-on-write for first component 102 and not for second component 104, independent of resource controller 116 after the configuration 185 by resource controller 116. For example, instructions 114 of resource controller 116, when executed, may configure 185 memory controller 130 such that, independent of resource controller 116 alter the configuration, memory controller 130 is to treat location IDs 133 as copy-on-write for first component 102 (without that treatment being managed or performed in whole or in part by resource controller 116) and treat location IDs 133 as read-only for second component 104 (or as read-write for second component 104) using the present mappings of locations IDs 133 to initial memory locations 142 (without that treatment being managed or performed in whole or in part by resource controller 116).

In some examples, a memory controller may have an associated control data structure stored in memory that defines how the memory controller is to operate. For example, the control structure for memory controller 130 may be stored in memory 140 (or any other accessible memory), and instructions 114, when executed, may edit the control structure to configure 185 memory controller 130 to, independent of resource controller 116, treat location IDs 133 as copy-on-write for first component 102 and as read-only for second component 104 (or as read-write for second component 104).

In examples described herein, after a memory controller is configured to treat a given location ID as copy-on-write fora given component, a first time (after the copy-on-write configuration) that a write packet including data to be written to the given location ID is received from the first component, the memory controller may (independent of resource controller 116) create a new, copy-on-write mapping of the given location ID to an alternate memory location for the given component and write the data to the alternate memory location. In such examples, in response to subsequent read and write packets to read from or write to the given location ID, the memory controller may (independent of resource controller 116) use the copy-on-write mapping to the alternate memory location to perform the read or write operation.

In the example of FIG. 1, memory controller 130, configured to treat location IDs 133 as copy-on-write for first component 102, may receive a write packet 180 comprising information 181 (e.g., a CID) identifying first component 102 as a source of write packet 180 and also including information 182 specifying a given one of location IDs 133 for the performance of a write operation. In such examples, memory controller 130 configured to treat the given location ID 133 as copy-on-write for the first component 102 may, independent of resource controller 116 and in response to write packet 180, determine whether memory controller 130 has already created a copy-on-write mapping for the given location ID 133. When it has not, memory controller 130 may, in response to packet 180 (and independent of resource controller 116), create 170 a new copy-on-write mapping 134 of the given location ID 133 to an alternative memory location for first component 102, and write data specified in the packet 180 to the alternative memory location. In such examples, to create the new copy-on-write mapping, memory controller 130 may allocate an available alternative memory location 144 in memory 140, and write mapping data 134 (e.g., to a data structure) to map the given location ID 133 to the allocated alternative memory location 144 for first component 102.

In such examples, though a new copy-on-write mapping 134 of the given location ID 133 is created for first component 102, memory controller 130 maintains the prior mapping of the given location ID 133 to a respective one of initial memory locations 142 for the second component 104 in the location ID mapping data 132. In such examples, the location ID mapping data 132 includes information specifying the different mappings of the given location ID 133 for the first and second components 102 and 104 as packet sources.

In such examples, after the copy-on-write mapping 134 for the given location ID 133 is created for first component 102, memory controller 130 may receive a read packet 184 comprising information 185 (e.g., a CID) identifying second component 104 as a source of the read packet 184 and including information 186 indicating the given location ID 133 for the performance of a read operation. In such examples, memory controller 130 (configured to treat the given location ID 133 as read-only or read-write for the second component 104) may, independent of resource controller 116, return initial data 143 stored in the initial memory location 142 to which the given location ID 133 is mapped for second component 104.

In such examples, to return the initial data 143, memory controller 130 may (independent of resource controller 116) access the mapping for the given location ID 133 for second component 104 to determine an initial memory location 142 to which it is mapped, read initial data 143 from the determined initial memory location 142, and provide the initial data 143 back to the second component in a packet via memory fabric 101. In some examples, the initial data 143 may be the data stored in initial memory locations 142 at the time that memory controller 130 was configured for copy-on-write for first component 102.

Although a single example of copy-on-write for first component 102 is described above, memory controller 130, configured for copy-on-write for first component 102, may similarly treat any or all other write packets from first component 102. For example, in response to each write packet comprising information identifying first component 102 as a source and information indicating, for a write operation, a respective one of location IDs 133 not already given a copy-on-write mapping, memory controller 130 (configured for copy-on-write) may, independent of resource controller 116, create 170 a copy-on-write mapping 134 of the respective location ID 133 to a respective alternate memory location 144 for first component 102 and write respective new data (e.g., from the write packet) to the alternative memory location 144, as described above.

Although a single example read for second component 104 is described above, memory controller 130, configured for copy-on-write for first component 102, may similarly treat any or all other read packets from second component 104. For example, in response to each read packet comprising information identifying second component 104 as a source and information indicating, for a read operation, one of location IDs 133, memory controller 130 (configured for copy-on-write) may, independent of resource controller 116, return initial data 143 stored in the initial memory location 142 to which location ID 133 is mapped for second component 104. In such examples, memory controller 130 may return the initial data 143 in response, regardless of whether a copy-on-write mapping 134 for first component 104 was created for the location ID 133.

In examples described herein, by configuring memory controller 130 to, independent of resource controller 116, treat location IDs 133 as copy-on-write for first component 102 and read-only or read-write for second component 104, examples described herein may enable a substantially instant, in-place snapshot 195 of the memory locations to which location IDs 133 are mapped, without pausing resource controller 116 or other resources, process(es), etc., executed by first component 102 (e.g., an OS, VMs, a hypervisor) at each attempt to write to memory of the snapshot 195, and without altering the data in the snapshot 195, which may be read unaltered by second component 104 (which may perform a forensic analysis, for example). Such examples may provide a relatively large performance improvement over examples in which a resource controller may directly handle individual requests to write to memory of the snapshot, rather than offloading such handling to the memory controller, as described herein.

In some examples, after configuring memory controller 130 to, independent of resource controller 116, treat location IDs 133 as copy-on-write for first component 102 and read-only or read-write for second component 104, computing device 100 may execute simultaneously at least a portion of an OS, VM, hypervisor, or the like, with first component 102 and at least a portion of a forensic analysis system with second component 104, without modifying the snapshot 195 comprising initial data 143 stored in initial memory locations 142 at the time of the configuration, and with each of first and second components 102 and 104 attempting to access initial physical memory locations 142 using location IDs 133. In such examples, by using resource controller 116 to configure memory controller 130 as described above to take the snapshot 195, the snapshot 195 may be taken in a manner that is transparent to first component 102, which may continue to use the same location IDs (e.g., addresses) to access memory as before the snapshot was taken. In this manner, the fact of the snapshot 195 being taken may be hidden from first component 102, the resources or processes it may be at least partially executing (e.g., OSs, VMs, hypervisor, etc.), and thus from any potential malware. In examples described herein, execution of a resource controller, such as an operating system, virtual machine, hypervisor, etc., may include execution of the resource controller itself and any number of processes or resource of or associated with the resource controller.

In examples in which component(s) are said to execute (or be assigned to execute) an OS, the component(s) may execute (or be assigned to execute) the OS and any number of processes of or associated with the OS. In examples in which component(s) are said to execute (or be assigned to execute) a hypervisor, the component(s) may execute (or be assigned to execute) at least one of a VM, an OS, user-space process(es), or the like, or a combination thereof, associated with the hypervisor. In the example of FIG. 1, resource controller 116 may be a hypervisor to be executed by (or at least in part by) first component 102.

In examples described herein, a hardware component may be assigned or associated with one CID, or a plurality of CIDs. In examples in which a component is associated with a plurality of CIDs, any of the CIDs associated with the component may identify the component as the source of a packet. For example, for a component having multiple processor cores (e.g., an SOC), a different CID may be assigned to each processor core of the component. In some examples, any of the CIDs assigned to processor cores of the component may identify the component as the source of a packet (e.g., a packet communicated on memory fabric 101) and may be considered assigned to or associated with the component. In such examples, to configure a memory controller as copy-on-write for such a component, the memory controller may be configured for copy-on-write, as described above, for all of the CIDs of the processor cores of the component. In some examples, these CIDs may be treated as a group such that a copy-on-write mapping, created in response to a packet identifying one of these CIDs as a source, is stored and used for all of the CDs associated with the component. Similarly, in some examples, for a component comprising electronic circuitry (such as forensic analysis circuitry implemented by at least one of an ASIC and an FPGA), a CID may be assigned to the electronic circuitry and identify the electronic circuitry as the source of a packet. In some examples, the CID assigned to the electronic circuitry may also be considered assigned to or associated with the component including the electronic circuitry, and may identify the component including the electronic circuitry as the source of the packet.

Although examples have been described above in relation to memory accessible via one memory controller, in other examples, memory accessible to a first component 102 for which a snapshot is to be taken may be distributed across a plurality of components. In such examples, for each memory controller mediating access to a portion of the memory for which a snapshot is to be taken, resource controller 116 may configure the memory controller for copy-on-write for the portion of memory for the first component, as described above, and configure the memory controller for read-only or read-write access for another component (e.g., to execute forensic analysis). In such examples, the snapshot may be released by resource controller 116 performing a release process (described below) at each memory controller configured for copy-on-write to take the snapshot.

As used herein, a "computing device" may be a desktop computer, laptop (or notebook) computer, workstation, tablet computer, mobile phone, smart device, switch, router, server, blade enclosure, or any other processing device or equipment including a processing resource. For example, a computing device may be a device comprising hardware components connected by a packet-based memory fabric, as described herein. In examples described herein, a processing resource may include, for example, one hardware processor or multiple hardware processors included in a single device or distributed across multiple devices. In examples described herein, a hardware processor may be a hardware processor core (which may be referred to herein as a "processor core").

As used herein, a "processor" or "processor core" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 112 to perform the functionalities described herein.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, combinations of hardware and programming may be implemented in a number of different ways. For example, the programming may be processor executable instructions stored on at least one non-transitory machine-readable storage medium and the hardware may include at least one processing resource to execute those instructions. In some examples, the hardware may also include other electronic circuitry. In some examples, functionalities described herein in relation to FIG. 1 may be provided in combination with functionalities described herein in relation to any of FIGS. 2-5.

Figure 2:
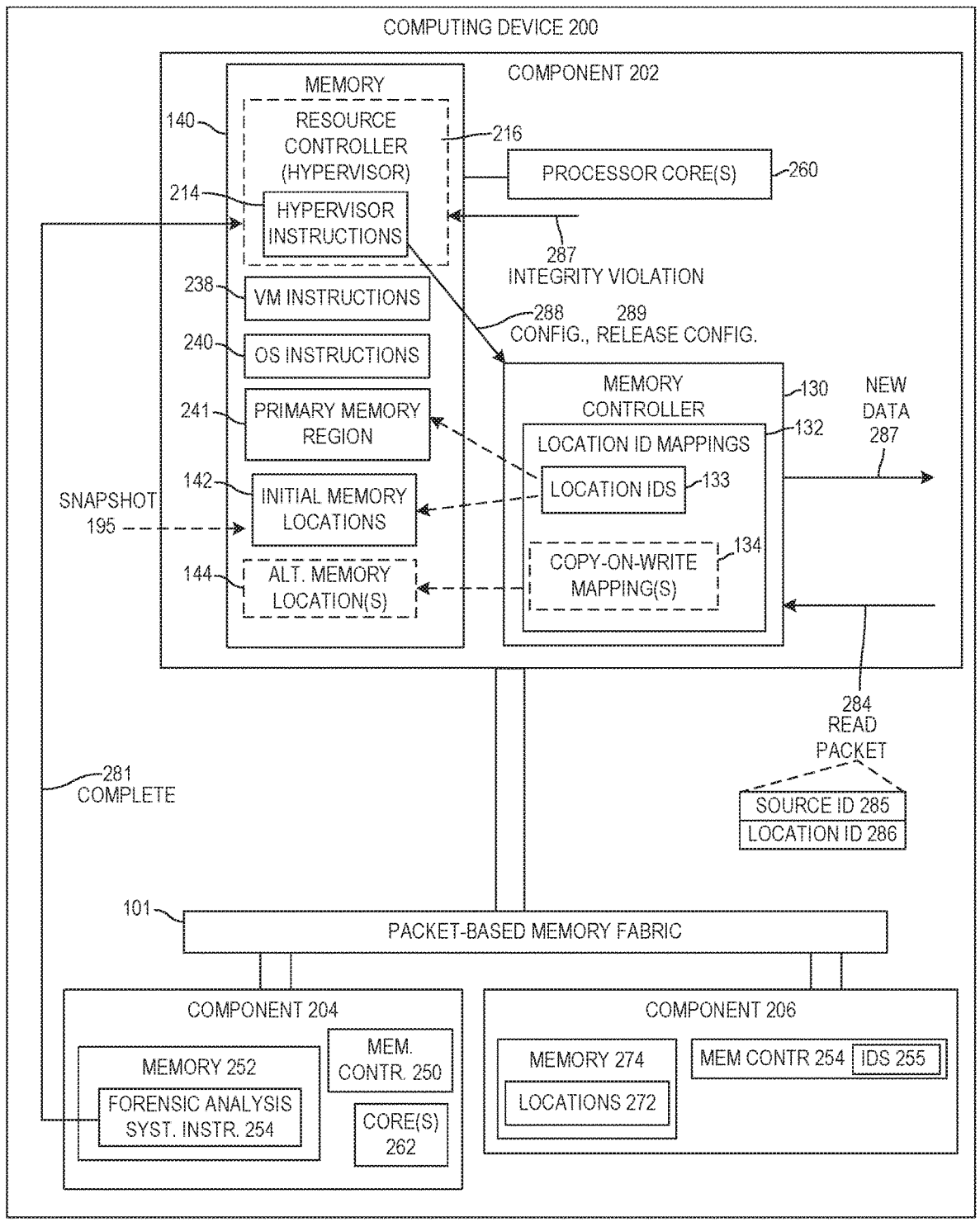
FIG. 2 is a block diagram of an example computing device having a resource controller to configure a memory controller for copy-on-write.

Further examples are described herein in relation to FIG. 2. FIG. 2 is a block diagram of example computing device 200 having a resource controller 216 to configure memory controller 130 for copy-on-write. In the example of FIG. 2, computing device 200 may include a packet-based memory fabric 101 and a management subsystem, each as described above in relation to FIG. 1. In the example of FIG. 2, computing device 200 may include a first component 202 and a second component 204. First component 202 may include memory 140 and memory controller 130, each as described above in relation to FIG. 1, and may include at least one processor core 260. Memory 140 may include initial memory locations 142, as described above, and memory controller 130 may include location ID mappings 132 for location IDs 133, as described above. In other examples, at least some of memory 140 may be implemented in a hardware component separate from component 202. For example, at least one of primary memory region 241, initial memory locations 142, and alternate memory locations 144 may be part of memory of a component separate from component 202 that is able to communicate with component 202 via memory fabric 101.

In the example of FIG. 2, computing device 200 includes a resource controller 216, which may be any suitable resource controller, as described above in relation to FIG. 1. In the example of FIG. 2, memory 140 may include instructions 214 executable by processor core(s) 260 to execute functionalities of resource controller 216 described herein. In some examples, resource controller 216 may be a hypervisor. In such examples, instructions 214 may be hypervisor instructions 214 to implement functionalities of a hypervisor, such as virtualizing hardware resources for virtual machines, managing virtual machines, and the like, in addition to the functionalities described below in relation to resource controller 216 and instructions 214. In such examples, memory 140 may include OS instructions 240 executable by core(s) 260 to execute at least a portion of an OS, and VM instructions 238 executable by core(s) 260 to execute at least a portion of a VM. In such examples, a hypervisor 216 may virtualize hardware resources of computing device 200 for a VM implemented by instructions 238, which may include execution of an OS via execution of OS instructions 240. In such examples, core(s) 260 of first component 202 may execute the VM, and the hypervisor 216 executed by core(s) 260 may manage the VM. In other examples, resource controller 216 may be any suitable resource controller described above in relation to FIG. 1, and instructions 214 may implement functionalities of that resource controller in addition to the functionalities described below.

Second component 204 may include memory 252, a memory controller 250 for at least memory 252, and at least one processor core 262. Memory 252 may be implemented by at least one machine-readable storage medium, and may store instructions 254 executable by core(s) 262 to execute at least a portion of a forensic analysis system. In the example of FIG. 2, computing device 200 may include a component 206 (e.g., SOC, memory module, etc.) comprising at least memory 274 (implemented by at least one machine-readable storage medium) and a memory controller 254 mapping location IDs 255 to initial memory locations 272 of memory 274.

In the example of FIG. 2, instructions 214 (e.g., hypervisor instructions 214 in some examples) may include instructions 114 described above in relation to FIG. 1. In such examples, resource controller 216 and instructions 214 may perform the functionalities described above in relation to resource controller 116 and instructions 114 described above in relation to FIG. 1. Instructions 214 may also include additional instructions (e.g., to execute functionalities of the resource controller).

In the example of FIG. 2, resource controller 216 (e.g., instructions 214, when executed by processing core(s) 260) may monitor for integrity violations in computing device 200, such as kernel integrity violations for an OS executed at least in part by core(s) 260 (e.g., changed code, etc.). In some example, instructions 214 may detect 287 an integrity violation (e.g., associated with first component 202), and may determine to take a snapshot 195 of memory 142 accessible to first component 202 in response to detection of the integrity violation. In some examples, instructions 214 may detect integrity violations based on detection of particular events (e.g., attempted unauthorized access to portion(s) of memory), signals received indicating the occurrence of particular events (e.g., from monitor(s) external to instructions 214), or the like, or a combination thereof. In examples described herein, functionalities described as performed by resource controller 216 may be performed by instructions 214 of resource controller 216, when executed by processing core(s) 260. Similarly, functionalities described as performed by instructions 214 (e.g., when executed by processing core(s) 260) may be considered performed by resource controller 216.

In response to the determination to take a snapshot of memory 142 accessible to first component 202, instructions 214, when executed, may execute resource controller 216 to configure 288 memory controller 130 to treat location IDs 133, mapped to initial memory locations 142 storing initial data 143 (see FIG. 1), as copy-on-write for first component 202 and as read-only or read-write for second component 204, as described above in relation to FIG. 1, independent of resource controller 216. In such examples, by execution of instructions 214, resource controller 216 may configure 288 memory controller 130 to treat location IDs 133, mapped to initial memory locations 142 storing initial data 143 (see FIG. 1), as copy-on-write for first component 202 and as read-only or read-write for second component 204, and such that memory controller 130 may perform this differential treatment of memory locations for different hardware components (e.g., SOCs) independent of further involvement (e.g., management or performance of the differential treatment, in whole or in part) by resource controller 216 after the configuration 288. In such examples, in response to the determination to take a snapshot 195 of the memory accessible to the first component 202, resource controller 216 may offload copy-on-write processing for the snapshot to memory controller 130 by configuring 288 memory controller 130 to treat the location IDs as copy-on-write for the first component and read-only for the second component. In such examples, the configuration 288 may offload the copy-on-write processing by configuring memory controller 130 to perform the differential treatment described above without further involvement by the resource controller 216 after it configures the memory controller 130 for the differential treatment, as described above.

In examples in which the resource controller 216 is a hypervisor 216, by execution of instructions 214, resource controller 216 may, in response to the determination to take a snapshot 195 of the memory accessible to first component 202, configure 288 memory controller 130 to treat location IDs 133, mapped to initial memory locations 142 storing initial data 143 (see FIG. 1), as copy-on-write for first component 202 and as read-only or read-write for second component 204, and such that memory controller 130 may perform this differential treatment of memory locations for different hardware components (e.g., SOCs) independent of further involvement by hypervisor 216 after the configuration 288 by hypervisor 216.

With the memory controller 130 configured for copy-on-write for first component 202, as described, in response to each write packet comprising information identifying first component 202 as a source and indicating, for a write operation, a respective one of location IDs 133 not already given a copy-on-write mapping, memory controller 130 may, independent of resource controller 216, create a copy-on-write mapping 134 of location ID 133 to a respective alternate memory location 144 for first component 202 and write respective new data to alternative memory location 144, as described above.

In such examples, with the memory controller 130 configured for copy-on-write for first component 202, in response to each read packet comprising information identifying second component 204 as a source and indicating, for a read operation, one of location IDs 133, memory controller 130 may, independent of resource controllers 216, return initial data 143 stored in the initial memory location 142 to which the location ID 133 is mapped for second component 204, as described above.

In examples described herein, after a memory controller creates a copy-on-write mapping for a location ID for a given component, the memory controller is to use the copy-on-write mapping for subsequent reads from and writes to that location ID for the given component. For example, in the example of FIG. 2, memory controller 130, configured to treat location IDs 133 as copy-on-write for first component 202, may receive a read packet 284 comprising information 285 (e.g., a CID) identifying first component 202 as a source and information 286 indicating, for a read operation, a given one of the location IDs 133 previously given a copy-on-write mapping. In such examples, in response to read packet 284, memory controller 130 may, independent of resource controller 216, return the respective new data 287 stored in the respective alternate memory location 144 to which the location ID 133 was mapped for first component 202. In such examples, to return the new data, memory controller 130 may access the copy-on-write mapping 134 for the given location ID 133 for first component 202 (e.g., for any of the CIDs associated with first component 202) to determine the alternative memory location 144 to which it is mapped, read the new data from the determined alternative memory location 144, and provide the new data 287 to a component or resource of first component 202 (e.g., a processor core), all independent of resource controller 216.

In such examples, after configuring memory controller 130 to treat location IDs 133 as copy-on-write for first component 202 and as read-only (or read-write) for second component 204 to take a snapshot 195 of the memory 142 accessible to first component 202, first component 202 (e.g., processor core(s) 260) may execute at least a portion of an OS (of OS instructions 240), a VM (of VM instructions 238), or a hypervisor (of hypervisor instructions 214), or a combination thereof, while the second component 204 is to simultaneously execute at least a portion of the forensic analysis system, including the first and second components each attempting to access multiple of the initial physical memory locations 142 using location IDs 133. In such examples, the configuration of memory controller 130 allows first component 202 to continue to operate and perform writes that do not change the snapshot 195 (in a manner that is transparent to first component 202 and the OS) and allows second component 204 to perform forensic analysis on the snapshot 195 without pausing the OS, VM, or hypervisor for writes to memory of snapshot 195. In some examples, after configuring memory controller 130 to treat location IDs 133 as copy-on-write for first component 202 and as read-only (or read-write) for second component 204 to take a snapshot 195 of the memory 142 accessible to first component 202, first component 202 (e.g., processor core(s) 260) may execute at least a portion of the OS using the VM executed on first component 202 and managed by the hypervisor executed on first component 202, while the second component 204 is to simultaneously execute at least a portion of the forensic analysis system, including the first and second components each attempting to access multiple of the initial physical memory locations 142 using location IDs 133.

The forensic analysis system executed at least in part by second component 204 may perform any suitable forensic analysis on the snapshot 195. For example, the forensic analysis system may scan the snapshot 195 to search for indicators of compromise (IOCs), patterns that indicate malicious behavior, data structure(s) open to a known malicious site, network connections to a suspect location, presence of a known malicious code package, suspect changes in the memory over time, or the like, or a combination thereof.

In some examples, the forensic analysis system may indicate 281 to the resource controller 216 that a particular portion of the forensic analysis system is complete such that the snapshot 195 of initial memory locations 142 may be released. In some examples, the forensic analysis system may copy the data of the snapshot 195, stored in initial memory locations 142, to other, secondary memory locations for analysis in the secondary memory locations. In such examples, once the copying is complete, the snapshot 195 may be released and the copy-on-write configuration may be lifted. In such examples, the forensic analysis system may indicate 281 to resource controller 216 that the process of copying is complete. In response, resource controller 216 may determine to release the snapshot 195.

In other examples, the forensic analysis system may perform the analysis on the snapshot 195 in place in the initial memory locations 142, and provide an indication 281 to resource controller 216 that the forensic analysis of the data of the snapshot 195 stored in the initial memory locations 142 is complete. In such examples, in response to the indication 281, resource controller 216 may determine to release the snapshot 195.

In response to determining to release the snapshot 195, resource controller 216 may release the snapshot 195. In some examples, releasing the snapshot 195 may include resource controller 216 configuring 289 memory controller 130 to provide, for first component 202, read-write access for location IDs 133 for which no copy-on-write mapping was created, thereby allowing such the corresponding initial memory locations 142 to be read and written by first component 202 again without using copy-on-write techniques. Releasing the snapshot 195 may also include resource controller 216, for each copy-on-write mapping 134 of one of location IDs 133 to an alternate memory location 134 created for first component 202, mapping the location ID 133 to the alternate memory location 144 for second component 204, and freeing (for reuse by memory controller 130) the initial memory location 142 to which the location ID 133 was previously mapped.

Although examples have been described above in relation to memory accessible via one memory controller, in other examples, memory accessible to a first component 202 (or other component) for which a snapshot is to be taken may be distributed across a plurality of components. In such examples, as described above, for each memory controller mediating access to a portion of the memory for which a snapshot is to be taken, resource controller 216 may configure the memory controller for copy-on-write for the portion of memory, as described above. In such examples, the snapshot may be released by resource controller 216 performing a release process at each memory controller configured for copy-on-write to take the snapshot.

For example, in addition to initial memory locations 142, initial memory locations 272 may be accessible to first component 202 via memory controller 254. In such examples, in response to the determination to take a snapshot of memory accessible to first component 202, resource controller 216 may configure memory controller 130 as described above and may configure memory controller 254 to treat location IDs 255 (mapped to initial memory locations 272), as copy-on-write for first component 202 and as read-only for second component 204 (or as read-write for second component 204), independent of resource controller 216, as described above in relation to FIG. 1.

In such examples, memory controller 254, configured for copy-on-write for first component 202, may receive a write packet comprising information (e.g., a CID) identifying first component 202 as a source of the packet and information indicating, for a write operation, a given one of location IDs 255 not already given a copy-on-write mapping. In response to such a write packet, memory controller 254 configured for copy-on-write for first component 202, may, independent of resource controller 216, create a copy-on-write mapping of the given location ID to a respective different memory location (e.g., in memory 274) for the first component 202, as described above in relation to memory controller 130. Although handling of one example packet is described, memory controller 254, configured for copy-on-write for first component 202, may similarly treat other write packets from first component 202 independent of resource controller 216.

In such examples, memory controller 254 may receive a read packet comprising information identifying the second component 204 as a source of the packet and information indicating, for a read operation, the given one of the location IDs 255. In response to such a read packet, memory controller 254 configured for copy-on-write for first component 202 and read-only or read-write for second component 204, may, independent of resource controller 216, return data stored in the initial memory location 272 to which the given location ID 255 is mapped for second component 204, as described above in relation to memory controller 130. Although handling of one example packet is described, memory controller 254, configured for read-only or read-write access for second component 204, may similarly treat other read packets from second component 204 independent of resource controller 216.

In an example described above, resource controller 216 is to configure two memory controllers to thereby take a snapshot involving memory in two separate components of computing device 200. In other examples, memory accessible to a first component (e.g., SOC) may be distributed across any number of components of computing device 200 connected by packet-based memory fabric 101, and may be accessed via any number of memory controllers. In such examples, in response to a determination to take a snapshot of memory accessible to the first component, resource controller 216 may configure each of the memory controllers mediating a portion of the accessible memory to, independent of resource controller 216, treat locations IDs as copy-on-write for the first component and as read-only or read-write for a second component (e.g., SOC), as described above in relation to FIGS. 1 and 2. In such examples, resource controller 216 may take a substantially instant, in-place snapshot of the memory accessible to the first component, for memory that is distributed in various components of computing device 200 connected by memory fabric 101 and is accessed via various different memory controllers. In such examples, the snapshot may be released by performing the release process described above for each of the involved memory controllers.

In some examples, memory controllers for memory accessible to the first component may maintain the accessible memory as a mirror (or duplicate) of other memory of computing device 200. In such examples, the snapshot may be taken, as described above, for the mirror or duplicate memory and not for the other (primary) memory.

As an example, memory controller 130 may maintain the accessible memory 142 as a mirror of a primary region of memory 241 different than the accessible memory 142, using location IDs 133 for the accessible memory 142 and primary memory region 241. In such examples, memory controller 130 may transparently perform the mirroring by mapping each location ID 133 to an initial memory location 142 and another memory location in primary memory region 241, and applying each operation targeting a location ID 133 to each of the mapped memory locations. In such examples, in response to a determination to snapshot the memory accessible to first component 202, resource controller 216 may configure memory controller 130 to, independent of resource controller 216, treat location IDs 133 as copy-on-write for the first component 202 for the initial memory locations 142, and may pause the mirroring of location IDs 133 to the primary memory region 241, ceasing writes to primary memory region 241 (and not configuring the location IDs 133 as copy-on-write for the first component for the primary region of memory 241). In this manner, after the configuration for copy-on-write, resource controller 216 may treat the information in the primary memory region 241 as the snapshot (e.g., for forensic analysis by component 204), and process(es) executed at least in part by first component 202 (e.g., an OS, VM, hypervisor, etc.) may continue to operate using the location IDs 133 for reads and writes of initial memory locations 142, while applying copy-on-write, as described above, to prevent changes to the initial data stored in initial memory locations 142.

In such examples, in releasing the snapshot, resource controller 216 may resume the mirroring by performing the release process described above for both the initial memory locations 142 and the primary memory region 241. In such examples, resource controller 216 may use alternative memory locations 144 from any copy-on-write operations to update the mappings of location IDs 133 for which copy-on-write operations were performed, for both the initial memory locations 142 and the primary memory region 241, thereby reconciling the contents of the two memory regions. Resource controller 216 may restore read-write access to both updated regions such that the mirroring resumes as before the snapshot. In some examples, functionalities described herein in relation to FIG. 2 may be provided in combination with functionalities described herein in relation to any of FIGS. 1 and 3-5.

Figure 3:
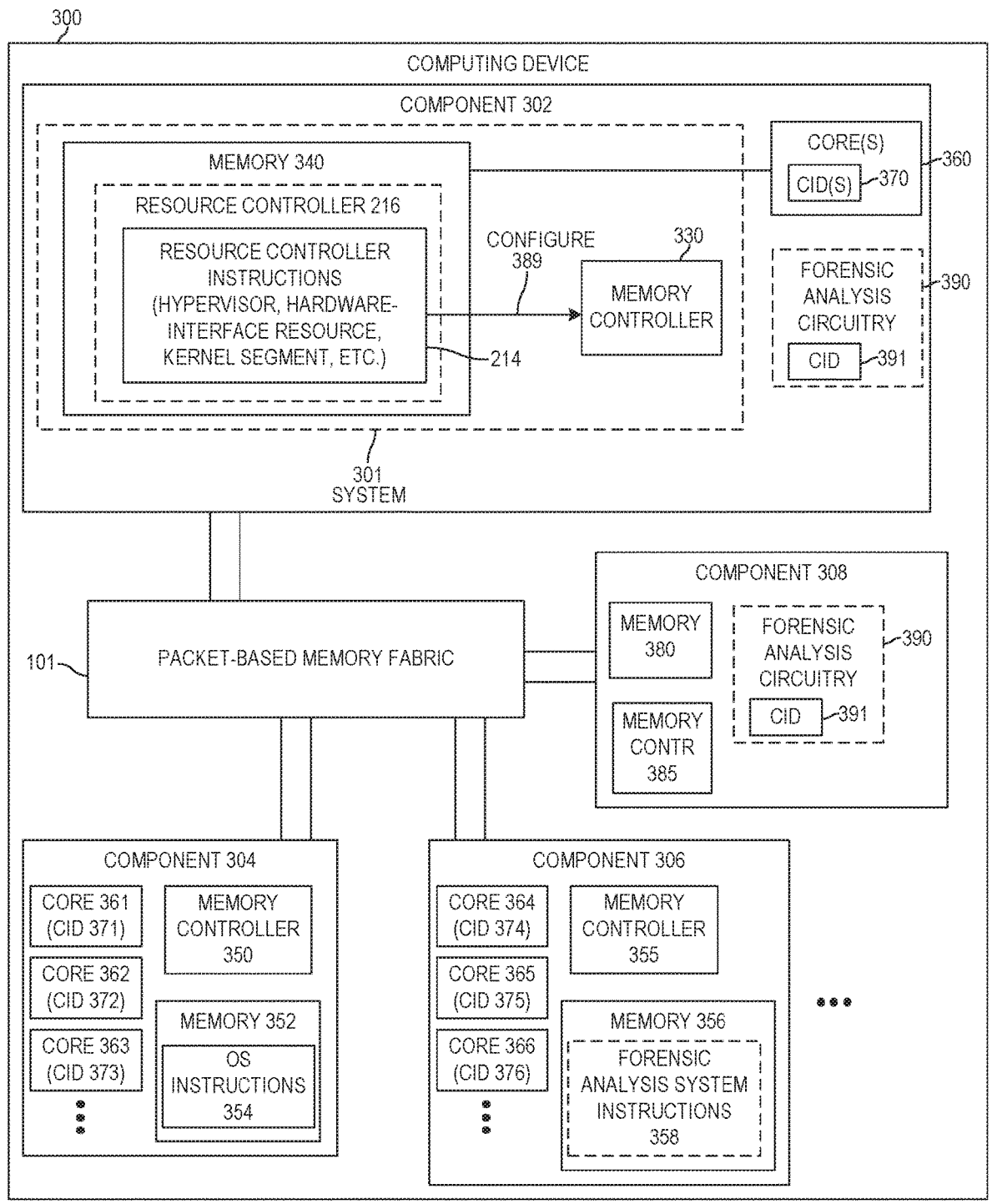
FIG. 3 is a block diagram of an example computing device including an example system to configure a memory controller for copy-on-write.

FIG. 3 is a block diagram of an example computing device 300 including an example system 301 to configure a memory controller for copy-on-write. Computing device 300 includes a plurality of hardware components interconnected to communicate using a packet-based memory fabric 101, as described above.

In the example of FIG. 3, the components may include a component 302 including other component(s), such as processor core(s) 360 assigned CID(s) 370. Component 302 may include memory 340 of computing device 300. The components may also include a component 304 including a plurality of components, such as at least processor cores 361-363 assigned CIDs 371-373, respectively. Component 304 may include memory 352 and a memory controller 350. The components may also include a component 306 including a plurality of components, such as at least processor cores 364-366 assigned CIDs 374-376, respectively. Component 306 may include memory 356 and a memory controller 355.

In the example of FIG. 3, system 301 comprises a memory controller 330 of the plurality of hardware components. In the example of FIG. 3, the memory controller 330 may be part of component 302. In other examples, memory controller 330 may be part of another type of component, such as a memory module. System 301 may also include a resource controller 216 and a management subsystem, as described above.

In the example of FIG. 3, different hardware components of computing device 300 may be assigned to execute different processes. For example, different core(s) among at least cores 360-366 of computing device 300 may be assigned to execute at least a portion of an OS, while other core(s) among at least cores 360-366 may be assigned to execute a forensic analysis system. In some examples, some or all of the core(s) assigned to execute the OS may be assigned to execute a VM to run the OS, and may be assigned to execute at least a portion of a hypervisor (e.g., resource controller 216) to manage the VM. In such examples, different core(s) among at least cores 360-366 of computing device 300 may be assigned to execute at least a portion of at least one of an OS, VM, and hypervisor, while other core(s) among at least cores 360-366 may be assigned to execute a forensic analysis system. In some examples, core(s) 360 may be among the core(s) assigned to execute at least a portion of at least one of an OS, VM, and hypervisor.

As an example, a first set of processor cores 360-363 may be assigned to execute at least a portion of an OS, such as by executing associated instructions from memory (e.g., from memory 340, memory 352, etc.). In such examples, core 360 may execute instructions from memory 340 and cores 361-363 may execute instructions from memory 352 (e.g., OS instructions 354). In such examples, cores 360-363 may form a first set of components to execute at least a portion of an OS (e.g., as part of a VM managed by a hypervisor 216), and the CIDs 370-373 assigned to cores 360-363 may form a first set of CIDs. In such examples, second set of processor cores 364-366 may be assigned to execute at least a portion of a forensic analysis system, such as by executing forensic analysis system instructions 358 from memory 356, In such examples, cores 364-366 may form a second set of components to execute a forensic analysis system, and the CIDs 374-376 assigned to cores 364-366 may form a second set of CIDs. This example division into first and second sets of components and CDs is an example for explanatory purposes in relation to FIG. 3. In other examples, other divisions may be made.

In the example of FIG. 3, the memory controller 330 may map certain location IDs to initial memory locations of memory 340 accessible to the first set of components. In the example of FIG. 3, memory of computing device 300 (e.g., memory 340) may include instructions 214 executable by at least component 302 (e.g., by at least core(s) 360) to execute a resource controller 216, as described above. In some examples, instructions 214 may be stored in an instruction memory region of the memory of component 302. In some examples, memory 340 may be implemented by a single memory device of component 302 that stores instructions 214 and that includes the initial memory locations (e.g., on the same memory device). In other examples, memory 340 may be implemented by multiple memory devices, and instructions 214 may be stored on a different memory device than a memory device including the initial memory locations. In such examples, component 302 may include the memory storing instructions 214, while the memory including the initial memory locations may be implemented on a separate component accessible to component 302 via the memory fabric 101, such as a component 308 including memory 380 (including the initial memory locations) and a memory controller 385.

In the example of FIG. 3, instructions 214, when executed by processor core(s) of computing device 300 (e.g., core(s) 360) separate from memory controller 330, may execute a resource controller 216 to determine to take a snapshot of the memory accessible to the first components, as described above. In the example of FIG. 3, instructions 214, when executed, may execute a resource controller 216 to, in response to the determination, configure 389 memory controller 330 to treat the location IDs mapped to the accessible memory as copy-on-write for sources identified by the first CIDs, respectively, and as read-only or read-write for at least one source identified by any second CID, independent of resource controller 216 after the configuration 389. Instructions 214 may configure memory controller 330 as described above in relation to memory controller 130 of FIGS. 1 and 2.

In such examples, memory controller 330 may receive a write packet comprising, for a write operation, a given one of the location IDs not already given a copy-on-write mapping and one of the first CIDs as a source identifier. In response, memory controller 330 configured for copy-on-write for the first CIDs may, independent of resource controller 216, create a copy-on-write mapping of the given location ID to a respective alternate memory location (e.g., in memory 340 or elsewhere) for sources identified by the first CIDs. In such examples, after creating the copy-on-write mapping for the given location ID, memory controller 330 may further receive a read packet comprising, for a read operation, the given location IDs and one of the second CID(s) as a source identifier. In response, memory controller 330 (configured for copy-on-write for first CIDs), may, independent of resource controller 216, return data stored in the initial memory location to which the given location ID is mapped for the second CID. Although a single example of copy-on-write for the first components is described above, memory controller 330, configured for copy-on-write for the first component, may similarly treat other write packets from first components (i.e., write packets including first CID(s) as source identifiers) independent of resource controller 216. Also, although a single example read for a second component is described above, memory controller 330, when configured for copy-on-write for first component 102, may similarly treat other read packets from second component(s) (i.e., read packets including second CID(s) as source identifiers) independent of resource controller 216.

In this manner, to take a snapshot, resource controller 216 (e.g., instructions 214) may configure memory controller 330 such that memory controller 330, independent of resource controller 216, may treat location IDs as copy-on-write for components associated with the first CIDs (e.g., assigned to execute an at least a portion of an OS) and may treat location IDs as read-only or read-write for components associated with second CID(s) (e.g., assigned to execute at least a portion of a forensic analysis system). In some examples, system 301 may include the first and second sets of processor cores. In examples described herein, functionalities described as performed by resource controller 216 may be performed by instructions 214 of resource controller 216, when executed by processing resource(s) (e.g., processing core(s)) or computing device 300. Similarly, functionalities described as performed by instructions 214 (e.g., when executed by processing resource(s)) may be considered performed by resource controller 216. In some examples, the resource controller 216 may be any suitable resource controller, as described above, such as a hardware-interface resource, a kernel segment, or the like, and instructions 214 may include instructions to execute that type of resource controller. In some examples, the resource controller 216 may be a hypervisor, as described above, instructions 214 may include instructions to execute the hypervisor 216. In such examples, instructions 214 may include instructions to execute the hypervisor 216, wherein the hypervisor may perform the functionalities described above in relation to resource controller 216, in addition to other functionalities of a hypervisor.

In other examples, a second CID (e.g., CID 391), not included in the first set of CIDs, may be assigned to forensic analysis circuitry 390 of system 301, the forensic analysis circuitry 390 to perform forensic analysis on the snapshot. In such examples, the forensic analysis circuitry 390 may comprise at least one of an application-specific integrated circuit (ASIC) and a field-programmable gate array (FPGA) to perform a forensic analysis as described above. In some examples, the forensic analysis circuitry 390 may be local to the accessible memory including the initial memory locations and the memory controller 330. In examples described herein, a component that is "local" to a memory controller and memory is a component that is part of the same hardware component (or in some examples the same hardware device) as the memory and memory controller, and not part of a separate hardware device separated from the memory and memory controller by the memory fabric 101.

In such examples, in response to a determination to take a snapshot of the memory accessible to the first components, which includes at least portions of memory 340, instructions 214, when executed, may execute a resource controller 216 to configure memory controller 330 such that memory controller 330 may, independent of resource controller 216 after the configuration, treat the location IDs mapped to the accessible memory as copy-on-write for sources identified by the first CIDs, respectively, and as read-only or read-write for a source identified by the second CID, which in this example, may be forensic analysis circuitry 390. In this manner, while memory controller 330 is configured to treat location IDs as copy-on-write for components associated with the first CIDs (i.e., assigned to execute an at least a portion of an OS), memory controller 330 is configured to treat location IDs as read-only or read-write for forensic analysis circuitry 390 associated with second CID 391, such that the forensic analysis circuity is able to read and perform forensic analysis on the data in the snapshot without the first components being paused in their execution for write operations and without altering the data of the snapshot. In some examples, system 301 may include the first components and forensic analysis circuitry 391.

In some examples, the forensic analysis circuitry 390 may be on the same component 302 as at least some core(s) 360 assigned to execute at least a portion of at least one of an OS, VM, and hypervisor, as described above, and on the same component 302 as the memory 340 including the initial memory locations and memory controller 330 to be configured to take a snapshot of the initial memory locations, as described above. In such examples, the forensic analysis circuitry 390 being on the same component 302 as the initial memory locations of memory 340 and the memory controller 330 (e.g., local to the accessible memory and memory controller) may reduce load on the memory fabric 101 caused by the forensic analysis process, compared to the load when the forensic analysis is performed by a component remote from the component 302 having memory 340 and memory controller 330. In other examples, forensic analysis circuitry 390 assigned CID 391 may be included in another component separate from core(s) 360, such as component 308. In some examples, component 308 may comprise memory 380 including the accessible memory having the initial memory locations, and may comprise a memory controller 385 to manage the accessible memory (as described above in relation to memory controller 330). In such examples, resource controller 216 may configure memory controller 385 for copy-on-write as described above in relation to memory controller 330 (e.g., memory controller 385 may be configured to treat location IDs as copy-on-write for components associated with the first CIDs and to treat location IDs as read-only or read-write for forensic analysis circuitry 390 associated with second CID 391). In some examples, having dedicated forensic analysis circuitry 390, implemented by at least one of an ASIC and an FPGA, may provide more robust isolation of the forensic analysis process from an OS under inspection, compared to an example in which the OS under inspection and the forensic analysis system are executed by different processing cores of a computing device.

Although examples have been described above in relation to memory accessible via one memory controller, in other examples, memory accessible to a first component for which a snapshot is to be taken may be distributed across a plurality of components. In such examples, for each memory controller mediating access to a portion of the memory for which a snapshot is to be taken, resource controller 216 may configure the memory controller for copy-on-write for the portion of memory for the first components, as described above in relation to one memory controller, and configure the memory controller for read-only or read-write access for other component(s) (e.g., to execute forensic analysis), as described above in relation to one memory controller. In such examples, the snapshot may be released by resource controller 216 performing a release process (described above) at each memory controller configured for copy-on-write to take the snapshot.

In the example of FIG. 3, components 302, 304, and 306 of computing device 330 may each comprise any suitable hardware component(s) described herein. For example, components 302, 304, and 306 may each comprise at least one SOC including processor core(s). In other examples, at least one of components 302, 304, and 306 may comprise a memory module including a memory controller. For example, component 302 may be a memory module including memory controller 330, memory 340, and forensic analysis circuitry 390, and excluding core(s) 360. In some examples, functionalities described herein in relation to FIG. 3 may be provided in combination with functionalities described herein in relation to any of FIGS. 1-2 and 4-5.

Figure 4:
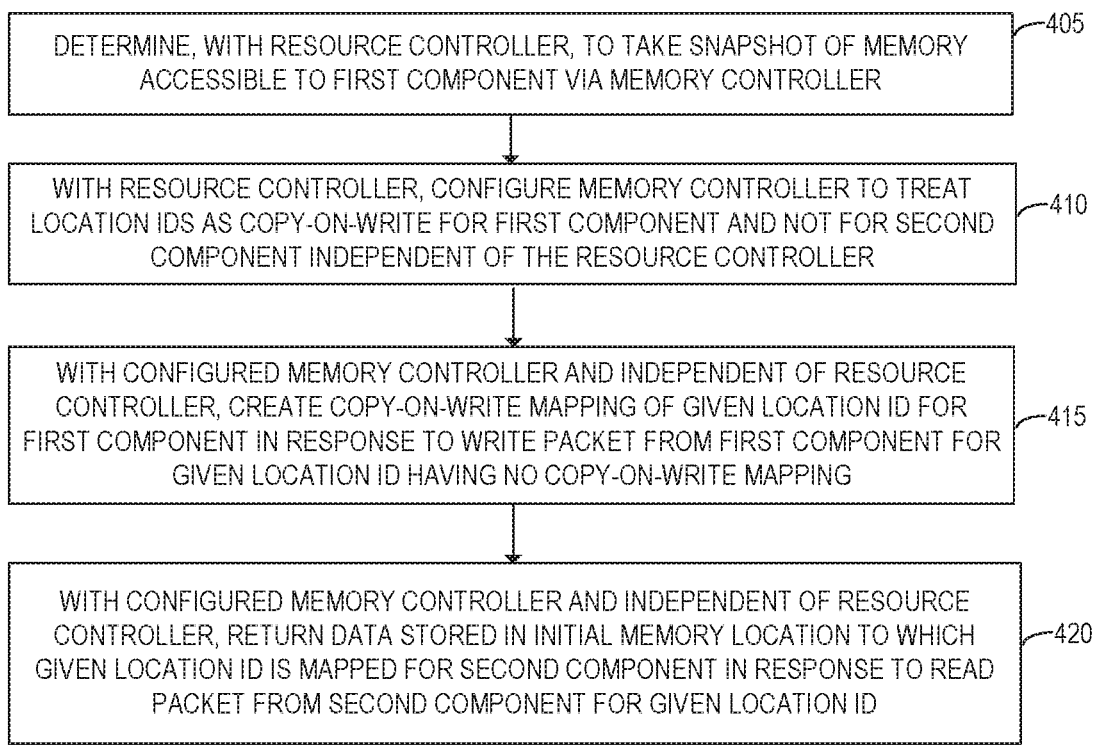
FIG. 4 is a flowchart of an example method to configure a memory controller for copy-on-write.

FIG. 4 is a flowchart of an example method 400 to configure a memory controller for copy-on-write. Although execution of method 400 is described below with reference to computing device 100 as described above in relation to FIG. 1, other suitable systems for the execution of method 400 can be utilized (e.g., computing device 200 of FIG. 2 or 300 of FIG. 3). Additionally, implementation of method 400 is not limited to such examples.

As described above, computing device 100 comprises first and second hardware components 102 and 104 interconnected by a packet-based memory fabric 101. At 405 of method 400, resource controller 116 (e.g., resource controller instructions 114, when executed) may determine to take a snapshot of memory accessible to first component 102 via a memory controller 130. As described above, memory controller 130 may map location IDs 133 to initial memory locations 142 of the accessible memory for first component 102. At 410, in response to the determination, resource controller 116 may configure memory controller 130 to treat the location IDs 133 as copy-on-write for the first component and not for the second component, independent of resource controller 116. In such examples, resource controller 116 may configure memory controller 130 such that memory controller 130 may, independent of resource controller 116, treat the location IDs 133 as copy-on-write for the first component and not for the second component. In some examples, resource controller 116 may configure memory controller 130 to treat location IDs 133 as read-only or read-write for the second component.

At 415, memory controller 130, configured for copy-on-write, as described above, in response to a write packet comprising information identifying first component 102 as a source and indicating, for a write operation, a given one of the location IDs 133 for which a copy-on-write mapping was not already created for the first component, may, independent of resource controller 116, create a copy-on-write mapping 134 of the given location ID 133 to an alternate memory location 144 for first component 102.

At 420, memory controller 130, configured for copy-on-write, as described above, after creating the copy-on-write mapping 134 and in response to a read packet comprising information identifying second component 104 as a source and indicating, for a read operation, the given location ID 133, may, independent of resource controller 116, return data 143 stored in initial memory location 142 to which the given location ID 133 is mapped for second component 104.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. Although examples have been described above in relation a first component provided copy-on-write access and a second component provided read-only or read-write access via a memory controller, other examples, one or a plurality of first components may be provided copy-on-write access, as described above, by one or a plurality of different memory controllers, and one or a plurality of second components may be provided read-only or read-write access, as described above, by one or a plurality of different memory controllers. In some examples, functionalities described herein in relation to FIG. 4 may be provided in combination with functionalities described herein in relation to any of FIGS. 1-3 and 5.

Figure 5:
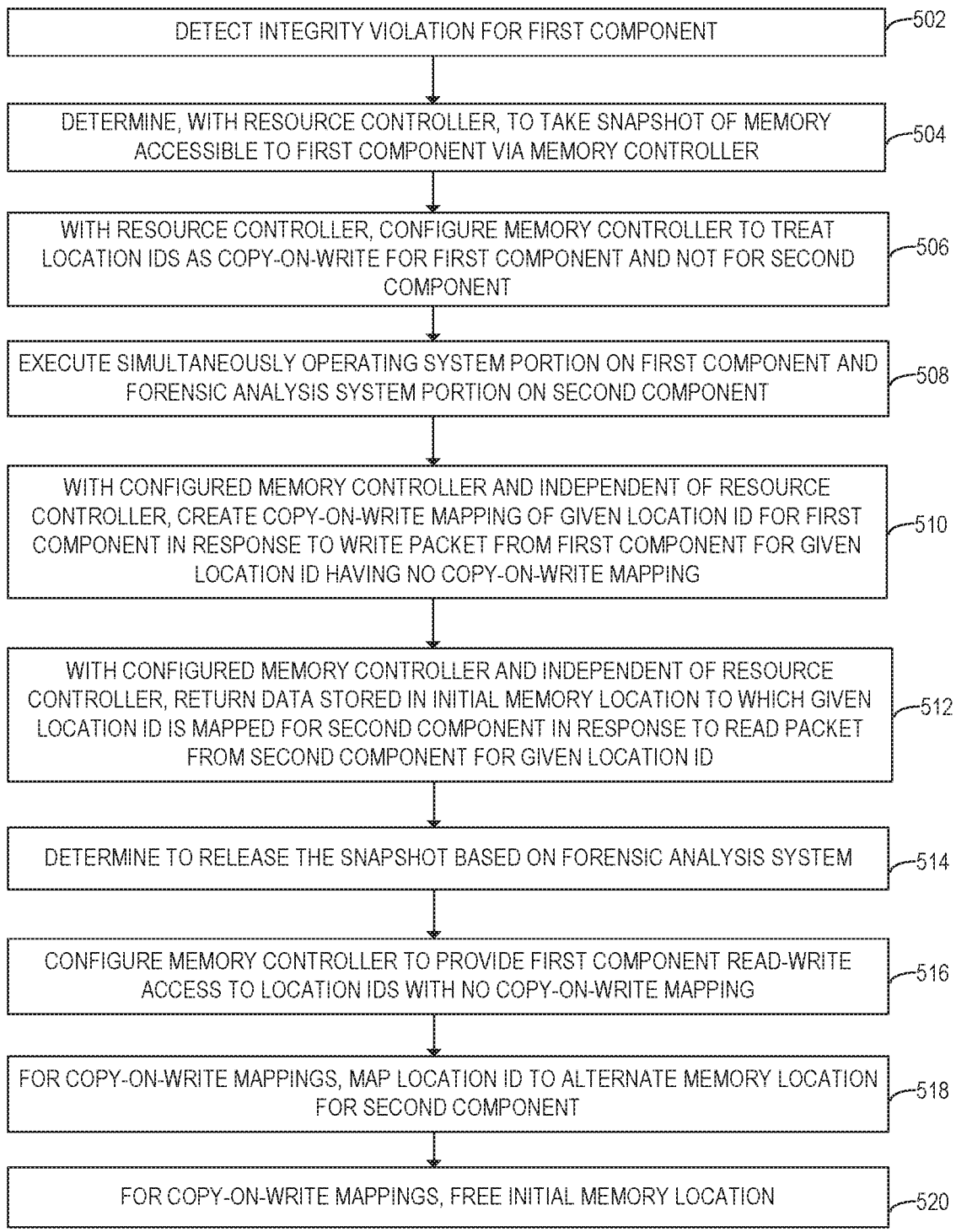
FIG. 5 is a flowchart of an example method to configure a memory controller for copy-on-write in response to an integrity violation.

FIG. 5 is a flowchart of an example method 500 to configure a memory controller for copy-on-write in response to an integrity violation. Although execution of method 500 is described below with reference to computing device 100 as described above in relation to FIG. 1, other suitable systems for the execution of method 500 can be utilized (e.g., computing device 200 of FIG. 2 or computing device 300 of FIG. 3). Additionally, implementation of method 500 is not limited to such examples.

As described above, computing device 100 comprises first and second hardware components 102 and 104 interconnected by a packet-based memory fabric 101. At 502 of method 500, resource controller 116 (e.g., resource controller instructions 114, when executed) may detect an integrity violation associated with first component 102 of the computing device (see FIG. 2). At 504, resource controller 116 may determine to take a snapshot 195 of memory accessible to first component 102 via a memory controller 130 in response to detection of the integrity violation. As described above, memory controller 130 may map location IDs 133 to initial memory locations 142 of the accessible memory for first component 102.

At 506, in response to the determination, resource controller 116 may configure memory controller 130 to treat the location IDs 133 as copy-on-write for the first component and not for the second component, independent of resource controller 116 after the configuration. In such examples, resource controller 116 may configure memory controller 130 such that memory controller 130 may, independent of resource controller 116 after the configuration, treat the location IDs 133 as copy-on-write for the first component and not for the second component. In some examples, instructions 221 may configure memory controller 130 to treat location IDs 133 as read-only or read-write for the second component.

At 508, after configuring memory controller 130, computing device 100 may execute simultaneously at least a portion of an OS, VM, or hypervisor with first component 102 and at least a portion of a forensic analysis system with second component 104, without modifying the snapshot comprising initial data stored in the initial memory locations at the time of the configuration, and with each of the first and second components attempting to access multiple of the initial physical memory locations using the location IDs.

At 510, in response to a write packet comprising information identifying first component 102 as a source and indicating, for a write operation, a given one of the location IDs 133 for which a copy-on-write mapping was not already created for the first component, memory controller 130 configured for copy-on-write may, independent of resource controller 116, create a copy-on-write mapping 134 of the given location ID 133 to an alternate memory location 144 for first component 102.

At 512, after creating the copy-on-write mapping 134 and in response to a read packet comprising information identifying second component 104 as a source and indicating, for a read operation, the given location ID 133, memory controller 130 configured for copy-on-write may, independent of resource controller 116, return data 143 stored in initial memory location 142 to which the given location ID 133 is mapped for second component 104.

At 514, resource controller 116 may determine to release the snapshot 195, as described above. In some examples, resource controller 116 may determine to release the snapshot 195 in response to an indication that the forensic analysis system has completed a process of copying the data of the snapshot or in response to an indication that the forensic analysis system has completed a forensic analysis of the data of the snapshot.

In response to the determination to release snapshot 195, at 516, resource controller 116 may configure memory controller 130 to provide, for first component 102, read-write access for location IDs 133 for which no copy-on-write mapping was created. At 518, for each copy-on-write mapping of one of the location IDs 133 to an alternate memory location 144 created for first component 102, resource controller 116 may map the location ID 133 to the alternate memory location 144 for second component 104. At 520, for each copy-on-write mapping of one of the location IDs 133 to an alternate memory location 144 created for first component 102, resource controller 116 may free the initial memory location 142 to which the location ID 133 was previously mapped.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. Although examples have been described above in relation a first component provided copy-on-write access and a second component provided read-only or read-write access via a memory controller, other examples, one or a plurality of first components may be provided copy-on-write access, as described above, by one or a plurality of different memory controllers, and one or a plurality of second components may be provided read-only or read-write access, as described above, by one or a plurality of different memory controllers. In some examples, functionalities described herein in relation to FIG. 5 may be provided in combination with functionalities described herein in relation to any of FIGS. 1-4.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method of a computing device comprising first and second hardware components interconnected by a packet-based memory fabric, the method comprising:
  detecting an integrity violation associated with the first component of the computing device, wherein the first component is to execute at least a portion of an operating system (OS);
  in response to the detection of the integrity violation, determining, with a resource controller of the computing device, to take a snapshot of memory accessible to the first component via a memory controller, the memory controller mapping location identifiers (IDs) to initial memory locations of the accessible memory for the first component;
  in response to the determination and with the resource controller, configuring the memory controller to treat the location IDs as copy-on-write for the first component and not for the second component independent of the resource controller after the configuring, wherein the second component to implement at least a portion of a forensic analysis system;
  with the memory controller configured for copy-on-write, and independent of the resource controller:
    in response to a write packet comprising information identifying the first component as a source and indicating, for a write operation, a given one of the location IDs for which a copy-on-write mapping was not already created for the first component, create a copy-on-write mapping of the given location ID to an alternate memory location for the first component; and
    after creating the copy-on-write mapping and in response to a read packet comprising information identifying the second component as a source and indicating, for a read operation, the given location ID, returning data stored in the initial memory location to which the given location ID is mapped for the second component.

2. The method of claim 1, wherein the resource controller is a hypervisor to be executed at least in part by the first component.

3. The method of claim 2, further comprising:
  executing a virtual machine (VM) at least in part on the first component, wherein the VM is managed by the hypervisor;
  in response to the determination, with the hypervisor, configuring the memory controller to treat the location IDs as read-only or read-write for the second component independent of the hypervisor.

4. The method of claim 1, further comprising:
  releasing the snapshot, comprising, with the resource controller:
    configuring the memory controller to provide, for the first component, read-write access for the location IDs for which no copy-on-write mapping was created; and
  for each copy-on-write mapping of one of the location IDs to an alternate memory location created for the first component:
    mapping the location ID to the alternate memory location for the second component; and
    freeing the initial memory location to which the location ID was previously mapped.

5. The method of claim 4, further comprising:
  determining to release the snapshot in response to an indication that a forensic analysis system of the computing device has completed a process of copying the data of the snapshot, stored in the initial memory locations, to secondary memory locations;
  wherein the releasing is performed in response to the determining to release the snapshot.

6. The method of claim 4, further comprising:
  determining to release the snapshot in response to an indication that a forensic analysis system of the computing device has completed a forensic analysis of the data of the snapshot stored in the initial memory locations,
  wherein the releasing is performed in response to the determining to release the snapshot.

7. The method of claim 1, further comprising:
  after the configuring, executing simultaneously the at least a portion of an OS, with the first component and the at least a portion of a forensic analysis system with the second component, without modifying the snapshot comprising initial data stored in the initial memory locations at the time of the configuration, and with each of the first and second components attempting to access multiple of the initial physical memory locations using the location IDs.

8. A computing device comprising:
  first and second hardware components to communicate using a packet-based memory fabric, the first component to execute at least a portion of an operating system (OS), and the second component to implement at least a portion of a forensic analysis system;
  initial memory locations accessible to the first component;
  a memory controller mapping location identifiers (IDs) to the initial memory locations storing initial data; and
  memory comprising instructions executable by at least one processing resource of the computing device to execute a resource controller to:
    detect an integrity violation associated with the first component of the computing device;
    in response to a determination to take a snapshot of the memory accessible to the first component based on detecting the integrity violation, offload copy-on-write processing for the snapshot to the memory controller by configuring the memory controller to treat the location IDs as copy-on-write for the first component and read-only for the second component;
  wherein the memory controller configured for copy-on-write is to, independent of the resource controller:
    in response to each write packet comprising information identifying the first component as a source and indicating a respective one of the location IDs not already given a copy-on-write mapping, create a copy-on-write mapping of the location ID to a respective alternate memory location for the first component and write respective new data to the alternative memory location; and
    in response to each read packet comprising information identifying the second component as a source and indicating one of the location IDs, return initial data stored in the initial memory location to which the location ID is mapped for the second component.

9. The computing device of claim 8, wherein:
  the memory controller is to maintain the accessible memory as a mirror of a primary region of memory different than the accessible memory, using the location IDs for the accessible memory and the primary memory region;

the instructions are not to configure location IDs as copy-on-write for the first component for the primary region of memory in response to the determination to take the snapshot; and when the snapshot is to be released; the instructions are to use any alternative memory locations to update mappings of the location Ds for both the accessible memory and the primary memory region.

10. The computing device of claim 8, wherein:

the first component comprises the memory controller, the memory, and the at least one processing resource; and the memory controller configured for copy-on-write is to, independent of the resource controller:

in response to a read packet comprising information identifying the first component as a source and indicating, for a read operation, a given one of the location IDs previously given a copy-on-write mapping, returning the respective new data stored in the respective alternate memory location to which the location ID was mapped for the first component.

11. The computing device of claim 8, wherein the resource controller is a hardware-interface resource having direct access to at least one hardware resource of the computing device that is not directly accessible to a separate process associated with the hardware-interface resource.

12. The computing device of claim 8, wherein:

the computing device comprises an operating system having a segmented kernel architecture comprising a management kernel segment to manage multiple processes of the computing device and multiple process kernel segments, each associated with one of the managed processes; and the resource controller is the management kernel segment of the operating system.

13. A system comprising:

memory of a computing device;

a memory controller to map location identifiers (IDs) to initial memory locations of the memory accessible to first hardware components assigned first component identifiers (CIDs), wherein a second hardware component is assigned a second CID and the hardware components communicate using a packet-based memory fabric, wherein the first component is to execute at least a portion of an operating system (OS); and instructions of the memory executable by at least one of the first components, separate from the memory controller, to execute a resource controller to:

detect an integrity violation associated with the first component of the computing device;

in response to a determination to take a snapshot of the memory accessible to the first components based on the detecting the integrity violation, configure the memory controller to treat the location IDs as copy-on-write for sources identified by the first CIDs, respectively, and read-only for a source identified by the second CID, wherein the second component is to perform forensic analysis on the snapshot;

wherein the memory controller configured for copy-on-write is to, independent of the resource controller:

in response to a write packet comprising a given one of the location IDs not already given a copy-on-write mapping and one of the first CIDs as a source identifier, create a copy-on-write mapping of the given location ID to a respective alternate memory location for sources identified by the first CIDs; and after creating the copy-on-write mapping, in response to a read packet comprising the given location ID and the second CID as a source identifier, return data stored in the initial memory location to which the given location ID is mapped for the second CID.

14. The system of claim 13, further comprising the first and second hardware components, wherein:

the resource controller is a hypervisor;

the first hardware components comprise first processor cores of a plurality of SOCs, wherein the first CIDs are assigned to the first processor cores and the first processor cores are to execute the at least a portion of the OS as part of a virtual machine managed by the hypervisor; and the second hardware component comprises a second processor core of the plurality of SOCs, wherein the second CID is assigned to the second processor core and the second processor core is to execute at least a portion of a forensic analysis system.

15. The system of claim 13, further comprising the first and second hardware components, wherein:

the first hardware components comprise a plurality of processor cores, wherein the first CIDs are assigned to the first processor cores and the first processor cores are to execute at least a portion of the OS; and the second hardware component comprises forensic analysis circuitry local to the memory controller and the accessible memory, the forensic analysis circuitry to perform forensic analysis on the snapshot, wherein the second CID is assigned to the forensic analysis circuitry and the forensic analysis circuitry comprises at least one of an application-specific integrated circuit (ASIC), and a field-programmable gate array (FPGA).

* * * * *